(12) United States Patent  (10) Patent No.: US 9,213,483 B2
Hong  (45) Date of Patent: Dec. 15, 2015

(54) MOBILE TERMINAL AND INFORMATION TRANSFER METHOD THEREOF

(75) Inventor: Hyun-Taek Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 535 days.

(21) Appl. No.: 12/410,039

(22) Filed: Mar. 24, 2009

(65) Prior Publication Data

US 2010/0041442 A1    Feb. 18, 2010

(30) Foreign Application Priority Data

Aug. 12, 2008    (KR) .................. 10-2008-0079066

(51) Int. Cl.
| | |
|---|---|
| H04M 1/00 | (2006.01) |
| H04W 4/00 | (2009.01) |
| H04M 1/725 | (2006.01) |
| H04W 40/00 | (2009.01) |
| G06F 3/0488 | (2013.01) |
| G06F 3/0481 | (2013.01) |
| G06F 3/0486 | (2013.01) |

(52) U.S. Cl.
CPC .......... *G06F 3/04886* (2013.01); *G06F 3/0486* (2013.10); *G06F 3/04817* (2013.01)

(58) Field of Classification Search
CPC ..................... H04M 1/72519; H04M 1/72583
USPC ....................................................... 455/566
See application file for complete search history.

(56) References Cited

U.S. PATENT DOCUMENTS

| | | | | |
|---|---|---|---|---|
| 5,801,700 | A * | 9/1998 | Ferguson ...................... | 715/748 |
| 7,003,308 | B1 * | 2/2006 | Fuoss et al. ................... | 455/466 |
| 7,317,919 | B1 * | 1/2008 | Ruf .............................. | 455/446 |
| 8,020,105 | B1 * | 9/2011 | Lemay et al. .................. | 715/746 |
| 2002/0152220 | A1 * | 10/2002 | Kang et al. .................... | 707/101 |
| 2006/0229016 | A1 * | 10/2006 | Jang et al. ..................... | 455/41.2 |
| 2007/0036346 | A1 * | 2/2007 | Kwon ........................... | 379/413 |
| 2008/0141301 | A1 * | 6/2008 | Azzaro et al. .................. | 725/34 |
| 2008/0195961 | A1 * | 8/2008 | Bae et al. ....................... | 715/769 |
| 2008/0256107 | A1 * | 10/2008 | Banga et al. ................... | 707/102 |
| 2009/0005011 | A1 * | 1/2009 | Christie et al. ............. | 455/412.2 |
| 2009/0058821 | A1 * | 3/2009 | Chaudhri et al. ............. | 345/173 |
| 2009/0143007 | A1 * | 6/2009 | Terlizzi ........................ | 455/3.06 |
| 2009/0153289 | A1 * | 6/2009 | Hope et al. ..................... | 340/5.1 |
| 2009/0178008 | A1 * | 7/2009 | Herz et al. ..................... | 715/840 |

FOREIGN PATENT DOCUMENTS

KR    10-0801650 B1    2/2008

OTHER PUBLICATIONS

Korean Office Action issued in related Application No. 10-2008-0079066 dated Jun. 8, 2014.

* cited by examiner

*Primary Examiner* — Lester Kincaid
*Assistant Examiner* — Andy Gu
(74) *Attorney, Agent, or Firm* — KED & Associates LLP

(57) ABSTRACT

A mobile terminal may always display an image (or icon) representing a specific object on a display screen and directly transmit certain information to the specific object by using the image (or icon). The mobile terminal may include a user input unit to receive a user's selection about at least one object to be floated from a user list, a display to display a floating icon indicating the selected object to be floated on one side of a display area, and a controller for transmitting certain information to the object to be floated when the certain information is dragged or moved onto the floating image (or icon) or when the floating image (or icon) is dragged or moved to the certain information.

24 Claims, 13 Drawing Sheets

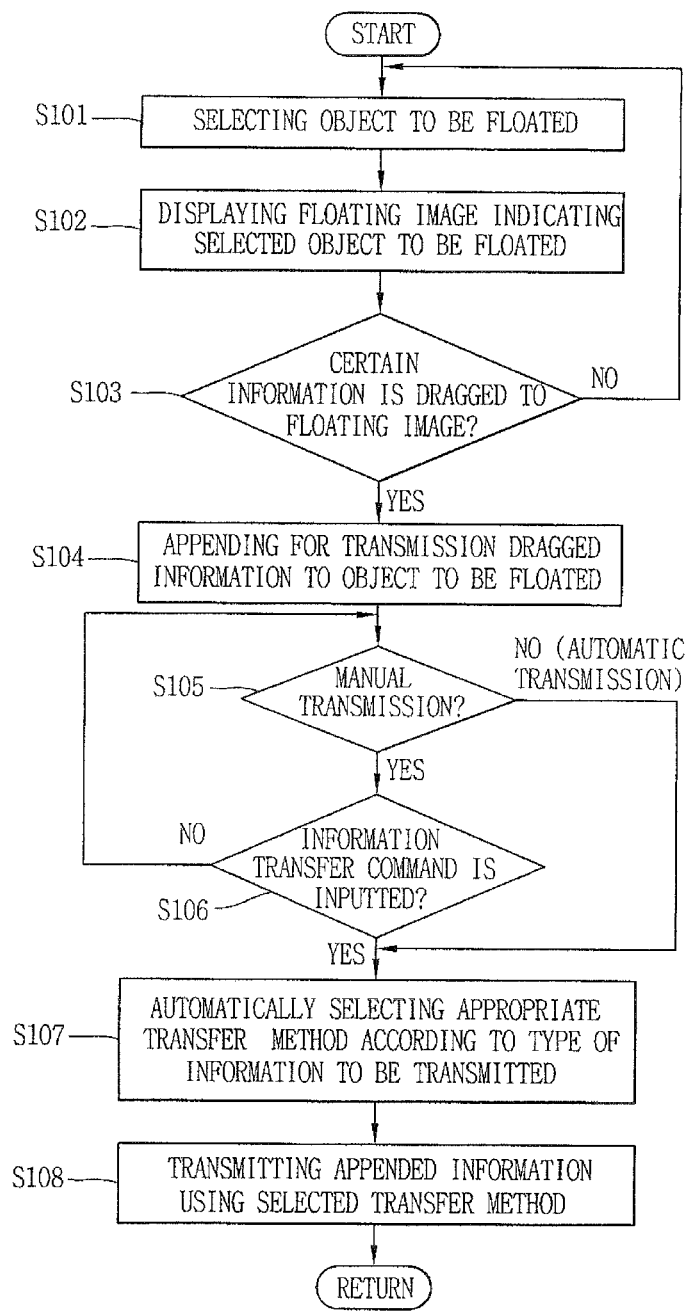

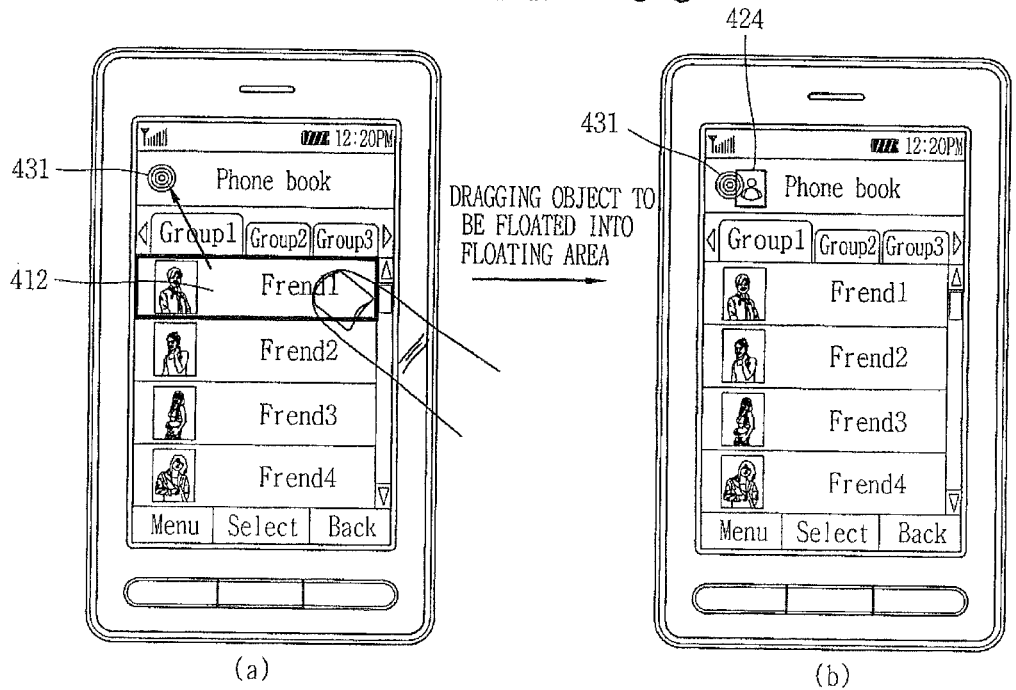
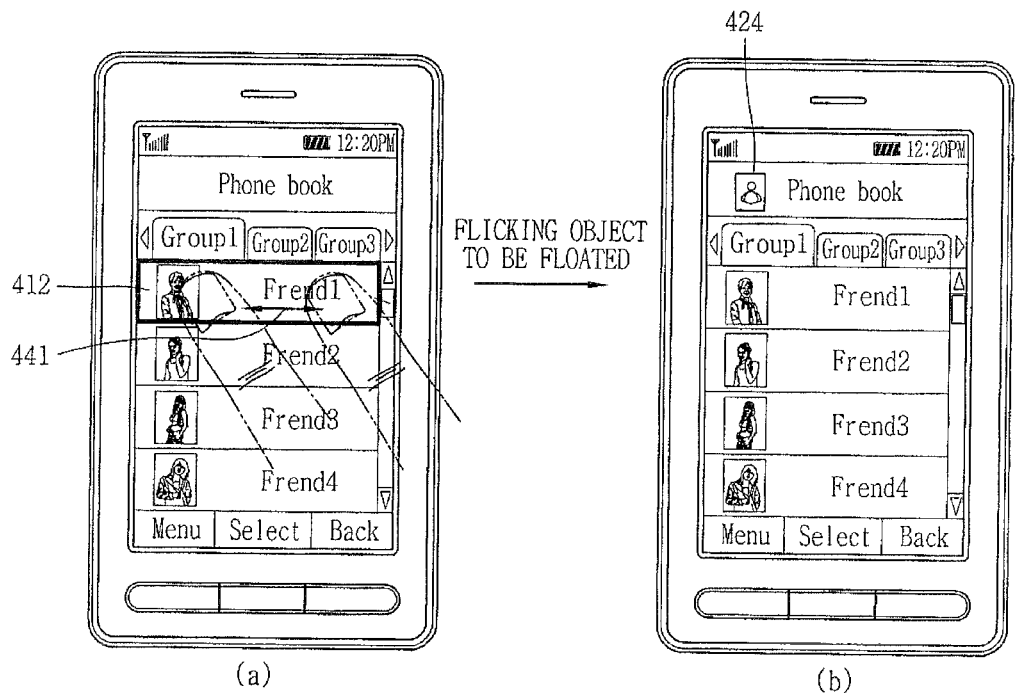

MOBILE TERMINAL AND INFORMATION TRANSFER METHOD THEREOF

The present application claims priority from Korean Application No. 10-2008-0079066, filed Aug. 12, 2008, the subject matter of which is hereby incorporated by reference.

BACKGROUND

1. Field

Embodiments of the present invention may relate to displaying image or an icon representing a specific object on a display screen and directly transmitting certain information to an entity corresponding to the object by using the displayed image or icon.

2. Background

A mobile terminal (e.g., personal computers, notebook computers, portable phones, etc.) may provide various functions. Examples of such functions may include data and voice communication, capturing images or video using a camera, storing voice, reproducing music files via a speaker system, displaying images or video and the like. Terminals may include additional functionality that supports playing games. Mobile terminals may also be configured as multimedia players. Mobile terminals may also receive broadcast signals or multicast signals to allow viewing of video or television programs.

Terminals may be classified as mobile terminals and stationary terminals according to whether the terminal is portable. The mobile terminals may be further classified as portable terminals (or handheld terminals) and vehicle mount terminals according to whether or not a user may directly carry the portable terminals.

Efforts are undergoing to support and increase functionality of mobile terminals. The efforts may include not only changes and improvement of structural components implementing a mobile terminal but also software and/or hardware improvement.

Mobile terminals have been equipped with basic call functions such as a video conference call or a voice call as well as a variety of information transfer functions such as message transmission. However, in order to transmit specific information or a file by using such a transfer function, a process may be performed of inputting information associated with another person (or object) by each transmission function and appending information to be transmitted.

BRIEF DESCRIPTION OF THE DRAWINGS

Arrangements and embodiments may be described in detail with reference to the following drawings in which like reference numerals refer to like elements and wherein:

FIG. 5 is a flowchart of an information transfer method for a mobile terminal according to an example embodiment of the present invention;

FIGS. 6A-6E illustrate a mobile terminal receiving a user's selection about an object to be floated according to an example embodiment of the present invention;

DETAILED DESCRIPTION

A description may now be provided of embodiments that may be illustrated in the accompanying drawings. Suffixes "module" and "unit" added to components used in the description may be added merely for ease of convenience in describing features. Accordingly, the suffixes "module" and "unit" may be used together.

Terminals may be implemented as a variety of forms. For example, terminals may include mobile terminals, such as a portable phone, a smart phone, a notebook computer, a digital multimedia broadcast terminal, a Personal Digital Assistant (PDA), a Portable Multimedia Player (PMP), a navigation and the like, and stationary terminals such as a digital TV, a desktop computer and the like. As used herein, the terminal may be a mobile terminal. However, other configurations may also be applied to stationary terminals (without components specifically configured for mobile terminals).

Figure 1:
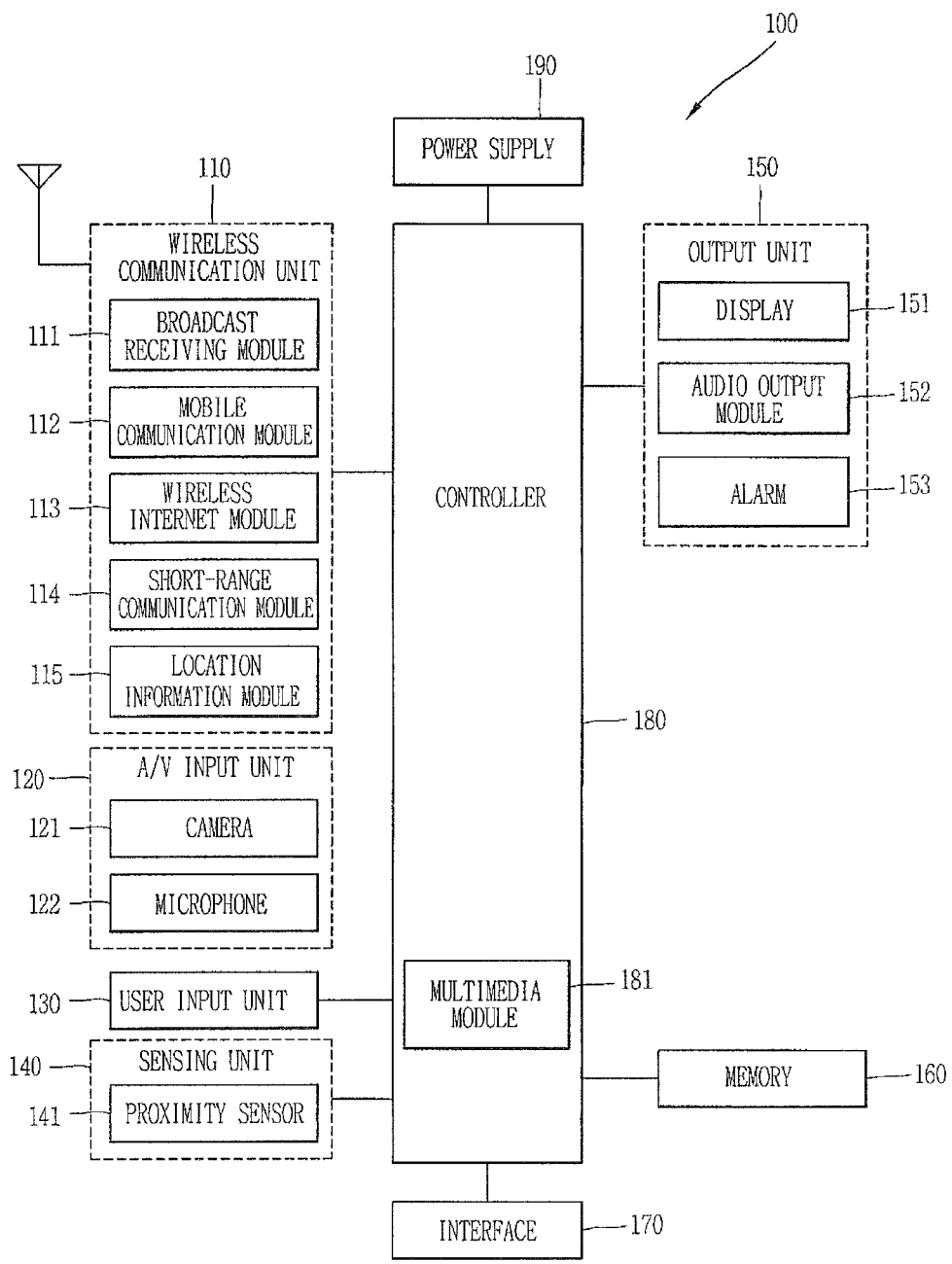
FIG. 1 is a block diagram of a mobile terminal according to an example embodiment of the present invention.

FIG. 1 is a block diagram of a mobile terminal according to an example embodiment of the present invention. Other embodiments and configurations may also be within the scope of the present invention.

FIG. 1 shows that a mobile terminal 100 may include a wireless communication unit 110, an A/V (Audio/Video) input unit 120, a user input unit 130, a sensing unit 140, an output unit 150, a memory 160, an interface 170, a controller 180, and a power supply 190, and the like. FIG. 1 shows the mobile terminal 100 having various components, although other components may also be used. More or less components may alternatively be implemented.

The wireless communication unit 110 may include one or more components allowing radio (wireless) communication between the mobile terminal 100 and a wireless communication system or a network within which the mobile terminal 100 is located. For example, the wireless communication unit 110 may include a broadcast receiver module 111, a mobile communication module 112, a wireless Internet module 113, a short-range communication module 114, a position-location module 115, and the like.

The broadcast receiver module 111 may receive a broadcast signal and/or broadcast associated information from an external broadcast managing server (or entity) via a broadcast channel. The broadcast channel may include a satellite channel and a terrestrial channel. The broadcast managing server (or entity) may be a server that generates and transmits a broadcast signal and/or broadcast associated information or a server that receives a previously generated broadcast signal and/or broadcast associated information and transmits the same to a terminal. Examples of the broadcast associated information may include information regarding a broadcast channel, a broadcast program, a broadcast service provider, etc. The broadcast signal may be implemented as a TV broadcast signal, a radio broadcast signal, and a data broadcast signal, for example. The broadcast signal may further include a broadcast signal combined with a TV or radio broadcast signal.

The broadcast associated information may be provided via a mobile communication network and the broadcast associated information may be received by the mobile communication module 112. The broadcast associated information may exist in various forms. For example, the broadcast associated information may be provided in an electronic program guide (EPG) of digital multimedia broadcasting (DMB), an electronic service guide (ESG) of digital video broadcast-handheld (DVB-H), and the like.

The broadcast receiver module 111 may receive broadcast signals using various types of broadcast systems. In particular, the broadcast receiver module 111 may receive a digital broadcast signal using a digital broadcast system, such as Digital Multimedia Broadcasting-Terrestrial (DMB-T), Digital Multimedia Broadcasting-Satellite (DMB-S), Digital Video Broadcast-Handheld (DVB-H), the data broadcasting system known as media forward link only (MediaFLO®), Integrated Services Digital Broadcast-Terrestrial (ISDB-T), and the like. The broadcast receiver module 111 may be suitable for every broadcast system that provides a broadcast signal as well as the above-described digital broadcast systems.

A broadcast signal and/or broadcast-associated information received via the broadcast receiver module 111 may be stored in the memory 160.

The mobile communication module 112 may transmit/receive radio signals to/from at least one of a base station, an external terminal and/or a server in a mobile communication network. The radio signals may include a voice call signal, a video call signal and/or various types of data according to text/multimedia message transmission/reception.

The wireless Internet module 113 may support Internet access for the mobile terminal 100. The wireless Internet module 113 may be internally or externally coupled to the mobile terminal 100. The wireless Internet technologies may include Wireless LAN (WLAN) (Wi-Fi), Wireless broadband (Wibro), World Interoperability for Microwave Access (Wimax), High Speed Downlink Packet Access (HSDPA), and the like.

The short-range communication module 114 may support short range communications. Examples of short-range communication technology may include Bluetooth™, Radio Frequency IDentification (RFID), Infrared Data Association (IrDA), Ultra-WideBand (UWB), ZigBee™, and the like.

The position-location module 115 may detect or otherwise calculate a position of the mobile terminal 100. The position-location module 115 may include a Global Position System (GPS) module. The GPS module may receive position information in cooperation with associated satellites. The position information may include coordinate information represented by latitude and longitude. For example, the GPS module may measure accurate time and distance respectively from more than three satellites so as to accurately calculate a current position of the mobile terminal 100 based on the three different distances according to a triangulation method. The triangulation method may obtain time information and distance information from three satellites and correct error by one satellite. The GPS module may further obtain three-dimensional speed information and an accurate time, as well as position on latitude, longitude and altitude, from the position information received from the satellites.

The A/V input unit 120 may input an audio and/or video signal to the mobile terminal 100. The A/V input unit 120 may include a camera 121 and a microphone 122. The camera 121 may process image frames of still pictures or videos obtained by an image capture device in a video call mode or an image capturing mode. The processed image frames may be displayed on a display 151 of the output unit 150.

The image frames processed by the camera 121 may be stored in the memory 160 or may be transmitted via the wireless communication unit 110. Two or more cameras 121 may be provided according to configuration of the mobile terminal 100.

The microphone 122 may receive an external analog audio signal (audible sound) via a microphone (or the like) in a phone call mode, a recording mode, a voice recognition mode, etc., and process the received signal into digital data. The processed audio (voice) data may be converted for output into a format transmittable to a mobile communication base station via the mobile communication module 112 when the mobile terminal 100 is in the phone call mode. The microphone 122 may include a noise canceling (or suppression) algorithm to cancel (or suppress) noise generated in the course of receiving and transmitting audio signals.

The user input unit 130 may generate key input data inputted by a user to control various operations of the mobile terminal 100. The user input unit 130 may include a keypad, a dome switch, a touch pad (e.g., a touch sensitive member that detects changes in resistance, pressure, capacitance, etc.), a jog wheel, a jog switch, and the like. When a touch pad is provided on the display 151 in a layered manner, it may be referred to as a touch screen.

The sensing unit 140 may detect a current status (or state) of the mobile terminal 100 such as an opened/closed state of the mobile terminal 100, a location of the mobile terminal 100, a presence or absence of user contact with the mobile terminal 100, etc., and may generate commands or signals for controlling operations of the mobile terminal 100. For example, when the mobile terminal 100 is a slide type mobile phone, the sensing unit 140 may sense whether the slide is opened or closed. Additionally, the sensing unit 140 may detect whether the power supply 190 supplies power or whether the interface 170 is coupled with an external device.

The interface 170 may be an interface with at least one external device connected to the mobile terminal 100. The external device may include a wired/wireless headset port, an external power charger port, a wired/wireless data port, a card socket, e.g., a memory card port, SIM/UIM/UICC cards, an audio input/output I/O) port, a video I/O port, an earphone port, etc.

An identification module may also be provided as a card or chip for storing various information required to authenticate use of the mobile terminal 100. The identification module may include a User Identity Module (UIM), a Subscriber Identity Module (SIM), a Universal Subscriber Identity Module (USIM), and the like. A device having the identification module (hereinafter referred to as an 'identification device') may be implemented as a type of smart card. The identification device may be coupled to the mobile terminal 100 via a port. The interface 170 may receive data from an external device, or may be provided with power and accordingly transfer the received data or power to components within the mobile terminal 100 or transfer data of the mobile terminal 100 to an external device.

When the mobile terminal 100 is to be connected to an external cradle, the interface 170 may be a path through which power from the cradle is supplied to the mobile terminal 100 or a path through which a variety of command signals inputted from the cradle by a user are transferred to the mobile terminal 100.

The command signals or power inputted from the cradle may operate as a signal to notify that the mobile terminal 100 is safely mounted at the cradle.

The output unit 150 may provide outputs in a visual, audible, and/or tactile manner (e.g., audio signal, video signal, alarm signal, etc.). The output unit 150 may include the display 151, an audio output module 152, an alarm 153, and the like.

The display 151 may output (or display) information processed in the mobile terminal 100. For example, when the mobile terminal 100 is in the phone call mode, the display 151 may display a User Interface (UI) or a Graphic User Interface (GUI) associated with a call or other communication on a display screen thereof. When the mobile terminal 100 is in the video call mode or in the image capturing mode, the display 151 may display a captured and/or received image, a UI, a GUI, and the like on its display screen.

When the display 151 and the touch pad are overlaid in a layered manner to form a touch screen, the display 151 may function as both an input device and an output device. The display 151 may include at least one of a Liquid Crystal Display (LCD) panel, a Thin Film Transistor-LCD (TFT-LCD) panel, an Organic Light Emitting Diode (OLED) display, a flexible display screen, a three-dimensional (3D) display screen, or the like. The display 151 may be configured to be transparent such that it is possible to see the exterior therethrough. These displays may be called transparent displays. An example of a transparent display may be a Transparent Organic Light Emitting Diode (TOLED), for example. The mobile terminal 100 may include two or more displays according to its desired implementation. For example, the mobile terminal 100 may include an external display (not shown) and an internal display (not shown). The touch screen may detect a touch input position and area as well as a touch input pressure.

The sensing unit 140 may include a proximity sensor 141. The proximity sensor 141 may be provided at an inner region of the mobile terminal 100 covered by the touch screen, or the proximity sensory 141 may be provided near the touch screen. The proximity sensor 141 may be a sensor to sense presence or absence of an object approaching a surface to be sensed, or an object disposed near a surface to be sensed, by using an electric field or infrared rays without a mechanical contact. The proximity sensor 141 may have a longer lifespan and a more enhanced utilization degree than a contact sensor.

The proximity sensor 141 may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and/or etc.

An operation principle of the high-frequency oscillation type proximity sensor will now be described. In a state that a high frequency full wave is oscillated in the oscillatory circuit, if an object to be sensed approaches a sensor surface, an oscillation amplitude of the oscillatory circuit may be reduced or stopped. Such change may be converted into an electrical signal, thus detecting the presence of the object to be sensed. Although any material, other than a metallic material, may be positioned between the high-frequency oscillation type proximity sensor and the object to be sensed, the proximity sensor 141 may detect the object to be sensed without being interfered by the object.

Even though the proximity sensor 141 is not mounted, if the touch screen is a static pressure type, it may detect proximity of a pointer by a change of an electric field due to the proximity of the pointer.

Therefore, even though the pointer is positioned proximate to the touch screen without actually contacting the touch screen, a position of the pointer and a distance between the pointer and the touch screen may be detected. For ease of discussion, a pointer positioned proximate to the touch screen without contact may be referred to as a 'proximity touch', whereas a pointer that substantially comes in contact with the touch screen may be referred to as a 'contact touch'. The pointer in a 'proximity touch' may be substantially vertically positioned with respect to the touch screen.

The proximity sensor 141 may sense a proximity touch and proximity touch patterns (e.g., distance, direction, speed, time, position, moving status, etc.). Information relating to the sensed proximity touch and the sensed proximity touch patterns may be output on the touch screen.

The audio output module 152 may output audio data received from the wireless communication unit 110 or output audio data stored in the memory 160 in a call signal reception mode, a call mode, a recording mode, a voice recognition mode, a broadcast reception mode, and the like. The audio output module 152 may also provide audible outputs related to a particular function (e.g., a call signal reception sound, a message reception sound, etc.) performed by the mobile terminal 100. The audio output module 152 may include a speaker, a buzzer, or the like.

The alarm 153 may provide outputs to inform about occurrence of an event of the mobile terminal 100. The events may include a call signal reception, a message reception, a key signal input, and the like. In addition to audio or video outputs, the alarm 153 may provide outputs in a different manner to inform about occurrence of an event. For example, the alarm 153 may provide outputs as vibrations (or other tactile means). When a call signal, a message, or some other incoming communication is received, the alarm 153 may provide tactile outputs (i.e., vibrations) to inform the user. By providing tactile outputs, the user can recognize occurrence of various events. Outputs informing about occurrence of an event may also be provided via the display 151 or the audio output module 152.

The memory 160 may store various types of data to support processing, control, and storage requirements of the mobile terminal 100. Examples of data may include program instructions for applications operating on the mobile terminal 100, call history, contact data, phonebook data, messages, pictures, video, etc. In addition, the memory 160 may store data regarding various types of vibrations and sounds being outputted when the touch screen is touched.

The memory 160 may include at least one type of storage medium including a flash memory type, a hard disk type, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM) magnetic memory, a magnetic disk, an optical disk, and the like. The mobile terminal 100 may cooperate with a web storage device on the Internet that remotely performs storage functions of the memory 160.

The controller 180 may control overall operations of the mobile terminal 100. For example, the controller 180 may perform control and processing associated with voice calls, data communications, instant message communications, video calls, camera operations and recording operations. As shown in FIG. 1, the controller 180 may also include a multimedia module 181 for providing multimedia playback functions. The multimedia module 181 may be part of the controller 180, or the multimedia module 181 may be implemented as a separate component. The controller 180 may perform a pattern recognition processing in which an input handwriting and an input picture-drawing performed on the touch screen are respectively recognized as a text and an image.

The power supply 190 may provide power used by the various components for the mobile terminal 100 under control of the controller 180. The provided power may be internal power, external power, and/or combinations thereof.

Various functionalities may be implemented in a computer-readable medium using, for example, computer software, hardware, and/or any combination thereof.

For a hardware implementation, functionalities described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform functions described herein. Such functionalities may be implemented by the controller 180.

For a software implementation, functionalities such as operation procedures or functions may be implemented together with separate software modules that allow performing of at least one function or operation. Software codes may be implemented by a software application written in any suitable programming language. The software codes may be stored in the memory 160 and executed by the controller 180.

The mobile terminal 100 has been described above from a functional perspective. Hereafter, external elements of the mobile terminal 100 may be described from the perspective of their functions with reference to FIGS. 2 and 3. The mobile terminal may be implemented in a variety of different configurations. Examples of such configurations may include a folder-type, a bar-type, a swing-type, a slide type and/or combinations thereof. For ease of description, the further description may relate to a slide-type mobile terminal. However, teachings may apply to other types of mobile terminals.

Figure 2:
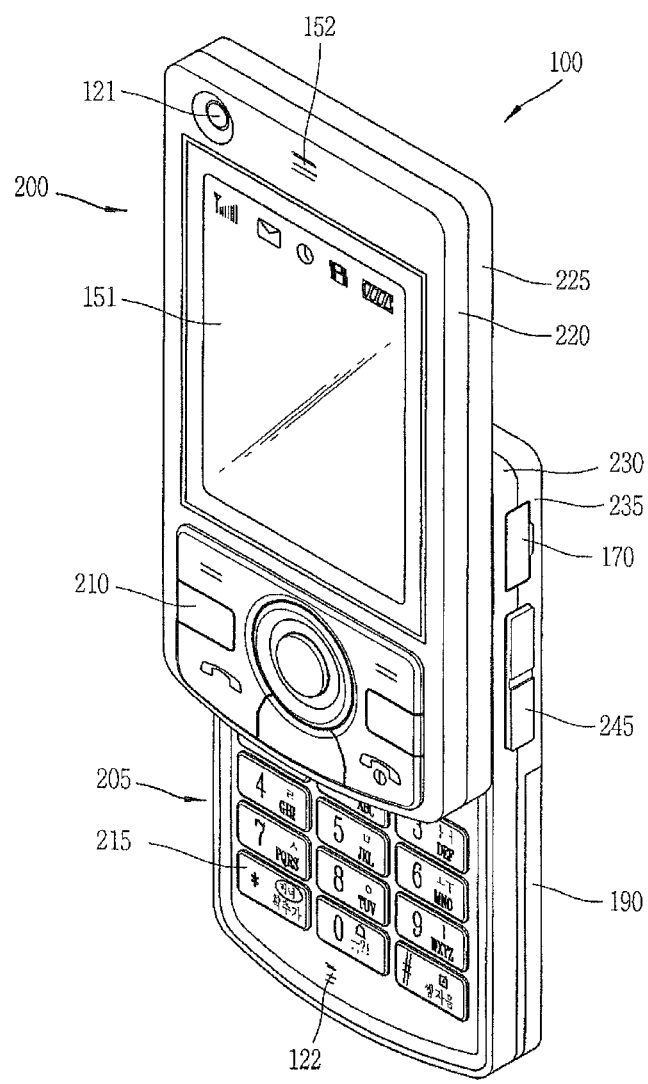
FIG. 2 is a front view of a mobile terminal.

FIG. 2 is a front view of a mobile terminal. Other arrangements, embodiments and configurations may also be provided.

FIG. 2 shows that the mobile terminal 100 may include a first body 200 and a second body 205 disposed to be slidably movable along at least one direction relative to one another. A folder-type of the mobile terminal 100 may include a first body and a second body having at least one side folded or unfolded relative to the first body.

A state in which the first body 200 overlaps with or overlies the second body 205 may be called a "closed configuration," and as shown in FIG. 2, a state in which the first body 200 and the second body 205 are so disposed relative one another so as to expose at least a portion of the second body 205 may be called an "opened configuration."

The mobile terminal may also be a folder-type mobile terminal that includes a first body and a second body configured to have at least one side thereof folded or unfolded relative to the first body. A state in which the second body is disposed to fold onto the first body may be called a closed configuration (or a closed state), and a state in which the second body is disposed to unfold relative to the first body may be called an open configuration (or an open state).

The mobile terminal may also be a swing-type mobile terminal that includes a first body and a second body configured to swing relative to the first body. A state in which the first body is disposed to overlie the second body may be called a closed configuration (or a closed state), and a state in which the first body and the second body are so disposed relative one another so as to expose at least a portion of the first body may be called an open configuration (or an opened state).

Folder-type and swing-type terminals are well known to those skilled in the art, and therefore further detailed descriptions may be omitted.

In the closed configuration, the mobile terminal may mainly operate in a standby mode (idle mode), and the standby mode may be released according to a user manipulation. The mobile terminal 100 may operate mainly in the calling mode or the like in the opened configuration, and the mobile terminal 100 may be changed to the standby mode with a lapse of a certain time period or a user manipulation.

The case (a casing, a housing, a cover, etc.) constituting an external appearance of the first body 200 may be formed by a first front case 220 and a first rear case 225, as shown in FIG. 2. Various electronic components may be installed in a space between the first front case 220 and the first rear case 225. One or more intermediate cases may also be provided between the first and second cases of one or both of the first and second bodies 200 and 205.

The first and second cases may be formed from a suitably ridge material such as injection molded plastic, or may be formed using metallic material such as stainless steel (STS) and titanium (Ti).

The display 151, an audio output module 152, a camera 121 and/or a first user input unit 210 may be located on the first body 200, and more specifically on the first front case 220 of the first body 200.

The display 151 has been described above. The audio output module 152 may be implemented in the form of a speaker. The camera 121 may capture images or video with respect to the user, for example.

Similar to the first body 200, the case constituting the external appearance of the second body 205 may be formed by a second front case 230 and a second rear case 235. A second user input unit 215 may be provided on a front face of the second body 205, and more specifically on the second front case 230.

A third user input unit 245, the microphone 122, and the interface 170 may be provided on at least one of the second front case 230 and the second rear case 235.

The first, second and third user input units 210, 215 and 245 may be referred to as the manipulation unit 130. Various techniques may be employed for implementing the manipulation unit 130 and such that they can be operated by a user in a tactile manner.

For example, the user input units may be implemented with a dome switch or a touch pad that can receive user commands or information according to a user's pressing, pushing or touching, or may be implemented in the form of a wheel that rotates a key, a jog element, a joystick, or the like.

The first user input unit 21 may be used for inputting commands such as start, end, scroll or the like. The second user input unit 215 may be used for inputting numbers, characters, symbols, or the like. The first user input unit 210 may include soft-keys used by interworking with icons displayed on the display 151, and navigation keys for indicating and confirming a direction. The navigation keys may include 4 directional keys and a central key.

The third user input unit 245 may operate as a hot key for activating a particular function within the mobile terminal 100.

The microphone 122 may transduce the voice of a user, other sounds, or the like.

The interface 170 may be a link (passage or path) through which the mobile terminal 100 can exchange data or the like with an external device.

The power supply 190 for supplying power to the mobile terminal 100 may be located at a side portion of the second rear case 235. The power supply 190 may be a rechargeable battery, for example, that can be detached.

Figure 3:
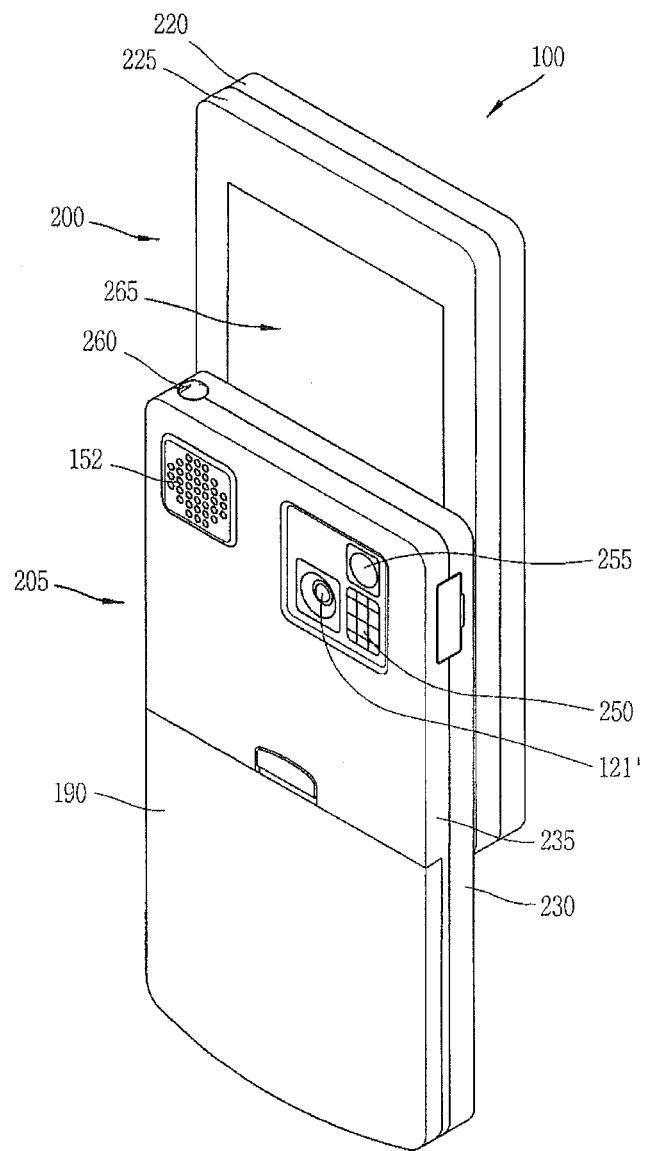
FIG. 3 is a rear view of the mobile terminal in FIG. 2.

FIG. 3 is a rear view of the mobile terminal 100 in FIG. 2.

FIG. 3 shows that a camera 121' may additionally be provided on a rear surface of the second rear case 235 of the second body 205. The camera 121' of the second body 205 may have an image capture direction that is substantially opposite an image capture direction of the camera 121 of the first body 200. The camera 121' may support a different resolution, image size, or number of pixels as compared to the camera 121 of the first body 200.

For example, the camera 121 of the first body 200 may operate with a relatively lower resolution to capture images of a user's face and transmit the same to the other party during video call communication or the like. The camera 121' of the second body 205 may operate with a relatively higher resolution to capture images of general subjects with high picture quality not for immediately being transmitted but for later use (or for communicating to others).

FIG. 3 also shows that a flash lamp 250 and a mirror 255 may be additionally provided adjacent to the camera 121' of the second body 205. When an image of a subject is to be captured with the camera 121' of the second body 205, the flash lamp 250 may illuminate the subject. The mirror 255 may allow a user to see themselves when they want to capture their own image (self-image capturing) by using the camera 121 of the second body 205.

The second rear case 235 may further include the audio output module 152.

The audio output module 152 of the second body 205 may implement a stereophonic sound function in conjunction with the audio output module 152 of the first body 200 and may be also used for sending and receiving audio calls in a speaker phone mode.

A broadcast signal receiving antenna 260 may be provided at one side or region of the second rear case 235, in addition to an antenna that supports mobile communications. The antenna 260 may be retractable from the second body 205.

One part of a slide module 265 that slidably combines the first body 200 and the second body 205 may be provided on the first rear case 225 of the first body 200.

The other part of the slide module 265 may be provided on the second front case 230 of the second body 205, which may not be exposed (as shown in the drawing).

Although the above describes that the second camera 121 and other components are provided on the second body 205, other configurations may also be used.

For example, one or more of the elements (e.g., 260, 121, 250 and 152) that are described above as being disposed or provided on the second rear case 235 may be mounted on the first body 200, and/or more specifically may be mounted on the first rear case 225. Those elements provided on the first rear case 225 may be protected (or covered) by the second body 205 in the closed configuration. In addition, even if the camera 121' of the second body 205 is not provided, the camera 121 of the first body 200 may rotate (or otherwise be moved) to thus allow image capturing in various directions.

The mobile terminal 100 may operate within a communication system that transmits data via frames or packets, including both wireless and wired communication systems, and satellite-based communication systems. Such communication systems may utilize different air interfaces and/or physical layers.

Figure 4:
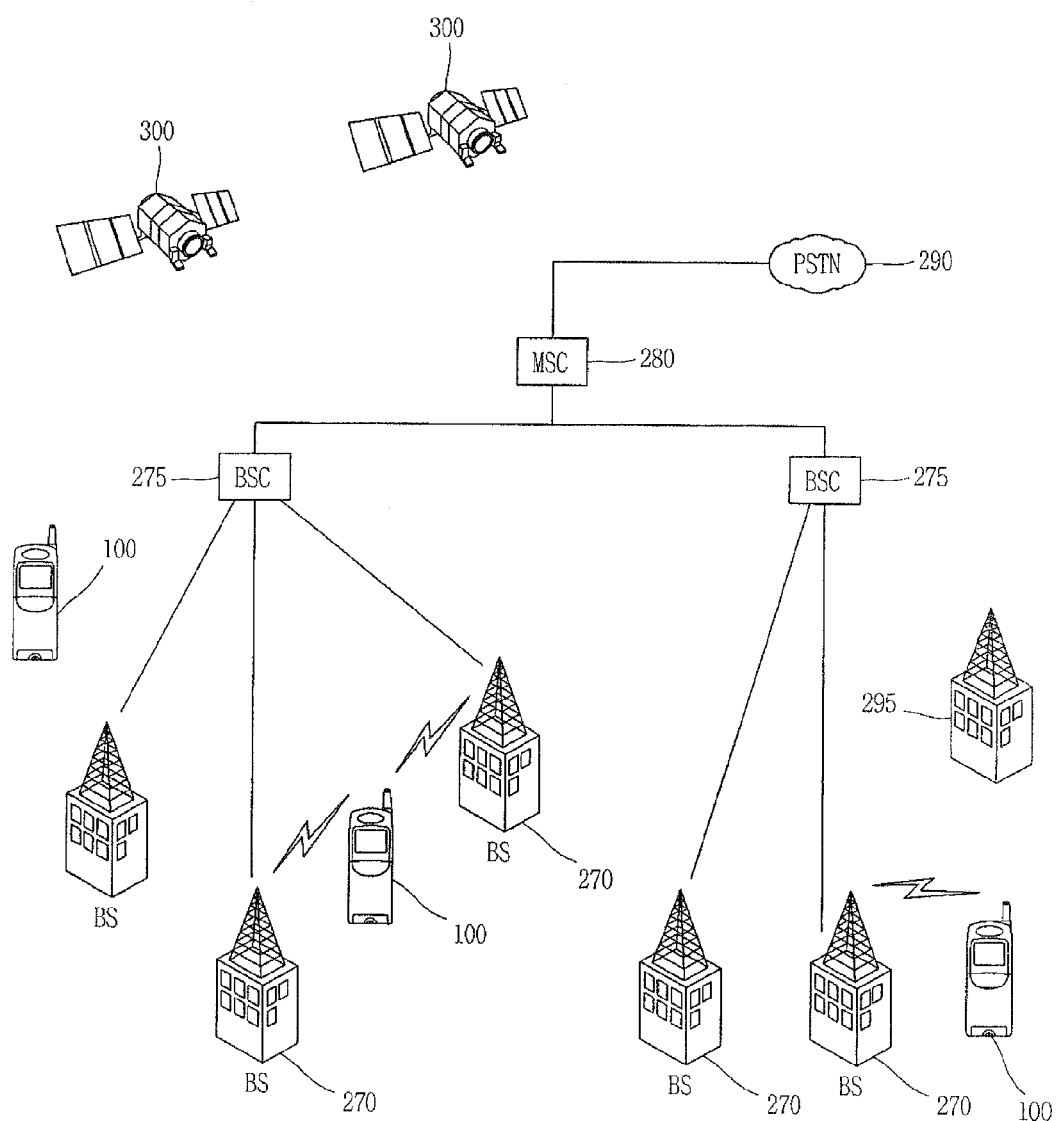
FIG. 4 is an overview of a communication system operable with a mobile terminal.

A description of a communication system operable with the mobile terminal 100 will now be provided with reference to FIG. 4.

The communication system may utilize different radio interfaces and/or physical layers. Examples of air interfaces utilized by the communication systems may include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). A further description may be provided with respect to a CDMA communication system, although such teachings may apply to other system types.

FIG. 4 shows a CDMA wireless communication system having a plurality of mobile terminals 100, a plurality of base stations (BS) 270, a plurality of base station controllers (BSCs) 275, and a mobile switching center (MSC) 280. The MSC 280 may interface with a public switch telephone network (PSTN) 290, and the MSC 280 may interface with the BSCs 275. The BSCs 275 may be coupled to the base stations 270 via backhaul lines. The backhaul lines may be configured in accordance with any of several interfaces including, for example, E1/T1, ATM, IP, PPP, Frame Relay, HDSL, ADSL, and/or xDSL. The system may include more than two BSCs 275.

Each base station 270 may include one or more sectors, with each sector having an omnidirectional antenna or an antenna pointed in a particular direction radially away from the base station 270. Alternatively, each sector may include two antennas for diversity reception. Each base station 270 may support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). The term "base station" may refer collectively to a BSC 275, and one or more base stations 270. The base stations 270 may also be called cell sites. Alternatively, individual sectors of a given base station 270 may be called cell sites.

FIG. 4 also shows a terrestrial digital multimedia broadcasting (DMB) transmitter 295 broadcasting to the mobile terminals 100 operating within the system. The broadcast receiving module 111 (FIG. 1) of the mobile terminal 100 may receive broadcast signals transmitted by the DMB transmitter 295.

FIG. 4 further shows several global positioning system (GPS) satellites 300. The satellites 300 may facilitate locating a position of some or all of the mobile terminals 100.

FIG. 4 only shows two satellites, although other numbers of satellites may be used to obtain positioning information. The position-location module 115 (FIG. 1) of the mobile terminal 100 may cooperate with the satellites 300 to obtain desired position information. Other types of position detection technology may alternatively be implemented such as location technology that may be used in addition to or instead of GPS location technology. The GPS satellites 300 may alternatively or additionally be configured to provide satellite DMB transmissions.

During operation of the wireless communication system, the base stations 270 may receive sets of reverse-link signals from various mobile terminals 100. The mobile terminals 100 may engage in calls, messaging, and/or other communications. Each reverse-link signal received by a given base station 270 may be processed within that base station 270, and the resulting data may be forwarded to an associated BSC 275. The BSC 275 may provide call resource allocation and mobility management functionality including soft handoffs between the base stations 270. The BSCs 275 may also route the received data to the MSC 280, which provides additional routing services for interfacing with the PSTN 290. The PSTN 290 may interface with the MSC 280, and the MSC 280 may interface with the BSCs 275. The BSCs 275 may also control the base stations 270 to transmit sets of forward-link signals to the mobile terminals 100.

The mobile terminal 100 may be configured to always display an image representing a specific object on an uppermost portion of a display screen (of the display 151). The specific object may represent a particular person (such as via an email address or phone number). The object may represent an entity (such as a particular person, a particular group, a particular company, etc.) The displayed image may be one of an image, an avatar, a character, or a thumbnail image. If any information displayed on the display 151 is dragged or moved onto the displayed image, the mobile terminal 100 may directly transmit such information to an entity corresponding to the specific object. The information may be directly transmitted by an appropriate method for transmitting such information (e.g., SMS, MMS, E-mail and Instant messenger). The displayed image (representing the specific object) may be referred to as a floating image or a floating icon.

FIG. 5 is a flowchart of an information transfer method for a mobile terminal according to an example embodiment of the present invention. Other operations, orders of operations, embodiments and configurations may also be within the scope of the present invention.

The controller 180 may receive a user's selection about an object to be floated in operation S101. For example, the object may represent a person or entity capable of directly receiving information selected by the user. The object may be selected from a user list displayed on a menu or may be directly received by the user inputting address information. The menu may include phonebook data, recent call history, and/or a message (or e-mail) inbox, for example.

The object may be selected using the user input unit 130. The object may correspond to a person (counterpart user), a website (e.g., a web hard disk or a web storage) address, an e-mail address and/or the like.

When the certain object is selected, the controller 180 may display in operation S102 a floating image (such as an icon, an avatar, a character, a thumbnail image) representing the selected object on the uppermost portion of the display screen. The floating image may always be displayed on the uppermost portion of the display screen (while the mobile terminal 100 is turned on) even when a particular menu is being displayed and/or being executed in the mobile terminal 100. In other words, the floating image may remain displayed on the display 151 even if other operations of the mobile terminal 100 are being used.

If, in operation S103, any information on the display 151 is dragged or moved to the displayed floating image or if the floating image is dragged or moved to any information on the display 151, the controller 180 may, in operation S104, append the information to the object for transmission by the mobile terminal 100. The controller 180 may associate the information with the object. The appended information may include a multimedia file, schedule information, a message (or e-mail), phonebook data, an address book, name card information, a widget file and/or the like.

In operation S105, a determination may be made whether a manual transmission has been set for the mobile terminal 100 or if an automatic transmission has been set for the mobile terminal 100 according to a preset environment setting option. When an automatic transfer option is set (i.e., a NO result in operation S105), the controller 180 may automatically transmit such information to an entity corresponding to the object immediately when the information has been appended. That is, in operation S107, the mobile terminal 100 may automatically select the appropriate transfer method according to the type of information to be transmitted. In operation S108, the mobile terminal 100 may transmit appended information using the selected transfer method.

Alternatively, when a manual transfer option is set (i.e., a YES result in S105) a determination may be made in operation S106 whether an information transfer command has been inputted. After the information has been appended, the information may automatically be transferred to an entity corresponding to the object in operations S107-S108.

In operation S107, the controller 180 may select an appropriate transfer method (or transfer function) according to a type of the appended information. The controller 180 may, in operation S108, then transfer the appended information to an entity corresponding to the object by using the selected transfer method. For example, for a simple text message having a capacity less than a certain value, a Short Message Service (SMS) may be used for transfer, and for a multimedia file, a Multimedia Message Service (MMS) may be used for transfer.

FIGS. 6A-6E illustrate a mobile terminal showing selecting an object to be floated according to an example embodiment of the present invention. Other embodiments and configurations may also be within the scope of the present invention.

The object to be floated may be selected from phonebook data, recent call history, a message (or e-mail) inbox, and/or the like. As an example, the object may correspond to a particular person, entity, and/or group. For ease of description, embodiments may hereafter be described with respect to selecting an object from a phonebook list.

Figure 6A:
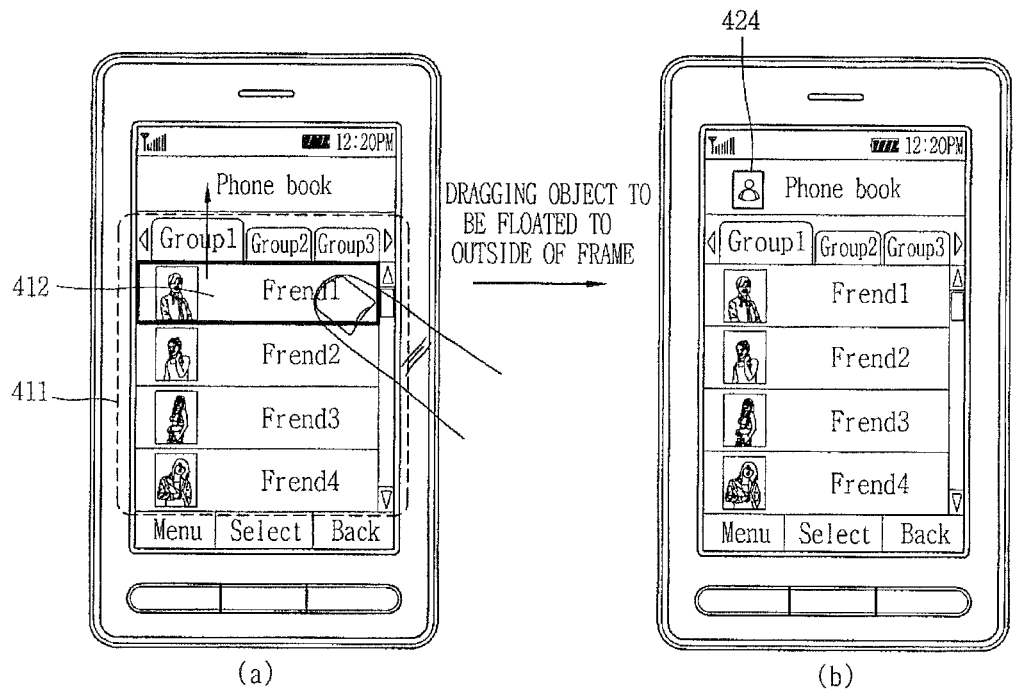

FIG. 6A shows that the mobile terminal 100 displays object information within a phonebook list frame 411. As shown in FIG. 6A(a), a user may select a certain object 412 from the phonebook list and then drag or move the selected object 412 to an area outside the phonebook list frame 411. As shown in FIG. 6A(b), the controller 180 may then display, on the display 151, a floating image 424 that represents the object 412.

A position on a display area to display the floating image may be set by default, or may be moved to another position by the user.

The floating image representing the selected object may be an icon, an avatar, a character and/or a thumbnail image.

Figure 6B:
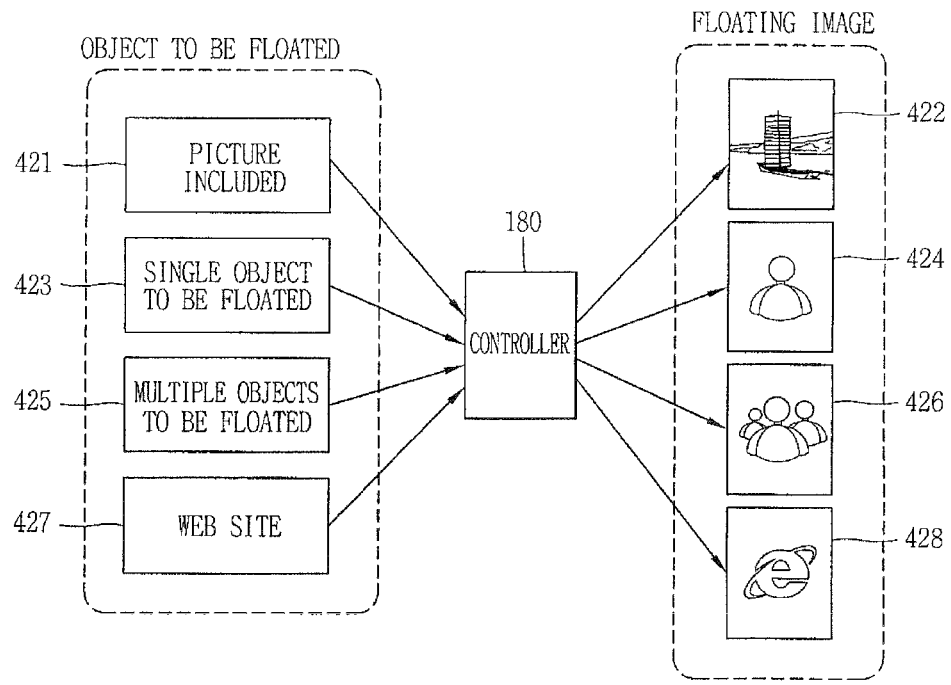

FIG. 6B shows several examples of objects to be floated and corresponding floating images. For example, if a picture 421 is included in the selected object, a thumbnail image of the picture may be displayed as a floating image 422. If there is only one object 423, an image showing one floating object may be displayed as the floating image 424. If multiple objects 425 are selected, an image showing multiple floating objects may be displayed as a floating image 426. If a website 427 is the selected object, a specific logo may be displayed as a floating image 428.

The display 151 may include a floating area 431, which is an area to float a specific object on one side of the display area. As shown in FIG. 6C(a), if the floating area 431 is pre-set, and if the user has selected the object 412 from the phonebook list and drags (or moves) the object 412 to the floating area 431, as shown in FIG. 6C(b), the controller 180 may display the floating image 424 indicating the object 412. The floating icon 424 may be displayed on one side of the display area.

As shown in FIG. 6D, the user may select an object from the phonebook list and flick (or move) the object in a preset direction (e.g., up/down/right/left) 441. The controller 180 may then display the floating image 424 indicating the object on one side of the display area.

Figure 6E:
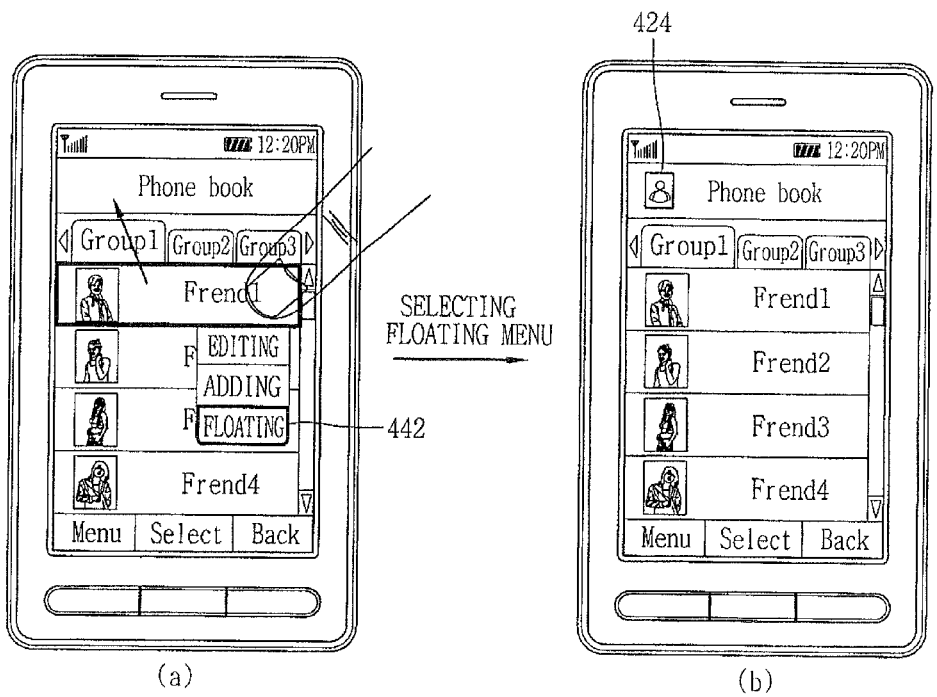

As shown in FIG. 6E, the user may select an object from the phonebook list and then retrieve a floating menu 442. The floating image 424 indicating the object may be displayed on the display area. Additionally, an object may also be floated by being touched for an amount of time longer than a preset period of time or greater than a preset pressure after the user has selected the object, and/or by receiving an input of a certain key manipulation.

Figure 7A:
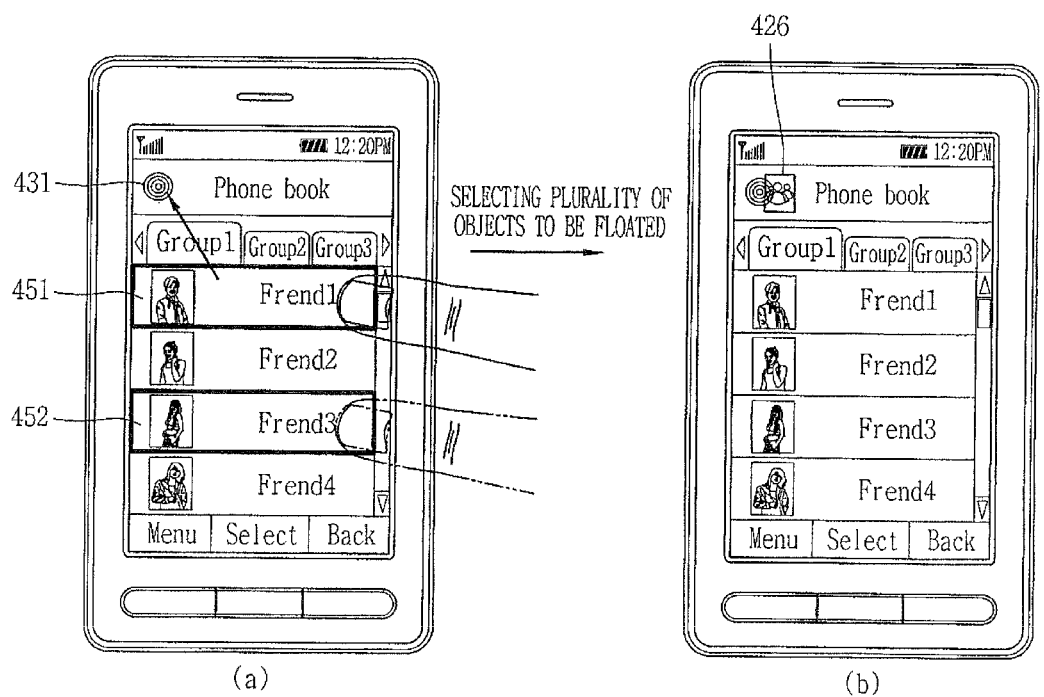
FIGS. 7A-7C illustrate a mobile terminal receiving a user's selection about an object to be floated according to an example embodiment of the present invention.
Figure 7B:
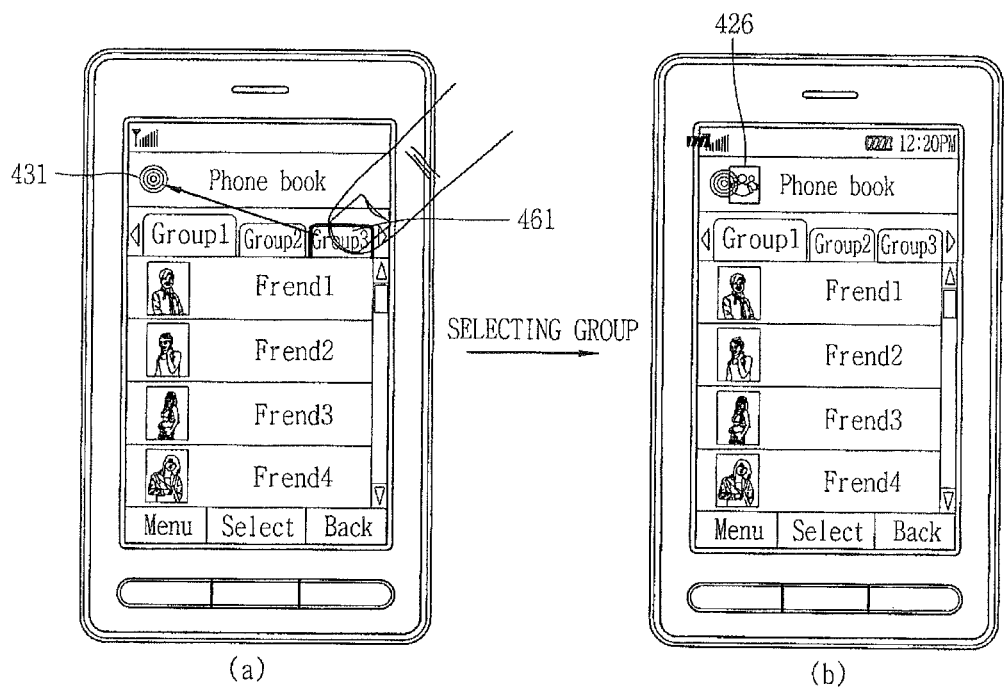
Figure 7C:
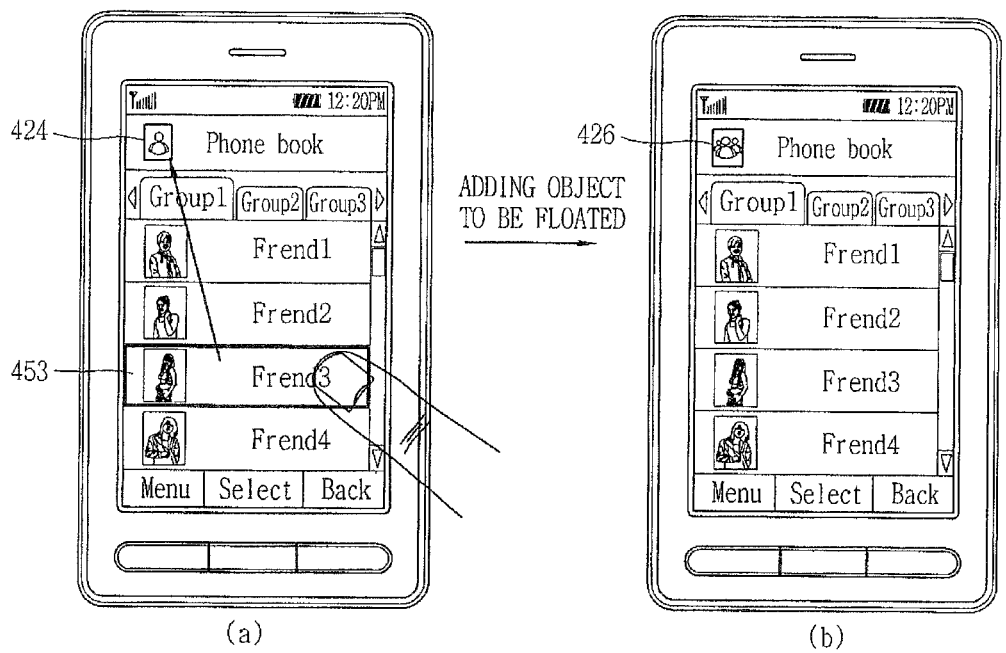

FIGS. 7A-7C illustrate a mobile terminal showing selecting an object according to an example embodiment of the present invention. Other embodiments and configurations may also be within the scope of the present invention.

A plurality of objects 451, 452 to be floated may be selected in the mobile terminal 100. For example, FIG. 7A(a) shows a user selecting the plurality of objects 451, 452 from the phonebook list. If the user drags or moves the selected objects 451, 452 to the floating area 431, the controller 180 may display the floating image 426. The floating image 426 may display a number of the objects to be floated, and/or the floating image 426 may simply display one floating image indicating that a plurality of objects are selected to be floated.

As shown in FIG. 7B, the user may select an entire group from the phonebook list. The user may select a group tag 461 and then drag or move the group tag 461 to the floating area 431. The controller 180 may consider all objects included in the group as objects to be floated. The floating image 426 may then be displayed for the selected group.

As shown in FIG. 7C, when the floating image 424 is displayed, the user may select an additional object 453 from the phonebook list and then drag or move the selected object 453 to the floating image 424. The additionally selected object 453 may be added by being dragged or moved to the displayed floating image 424. Since a plurality of objects are to be floated, the controller 180 may display the floating image 426 indicating that a plurality of objects are to be floated.

Although not shown, if the user selects an object to be floated from a website list or an e-mail list, the controller 180 may display the floating image 428 indicating that the object is a website or an e-mail.

Figure 8:
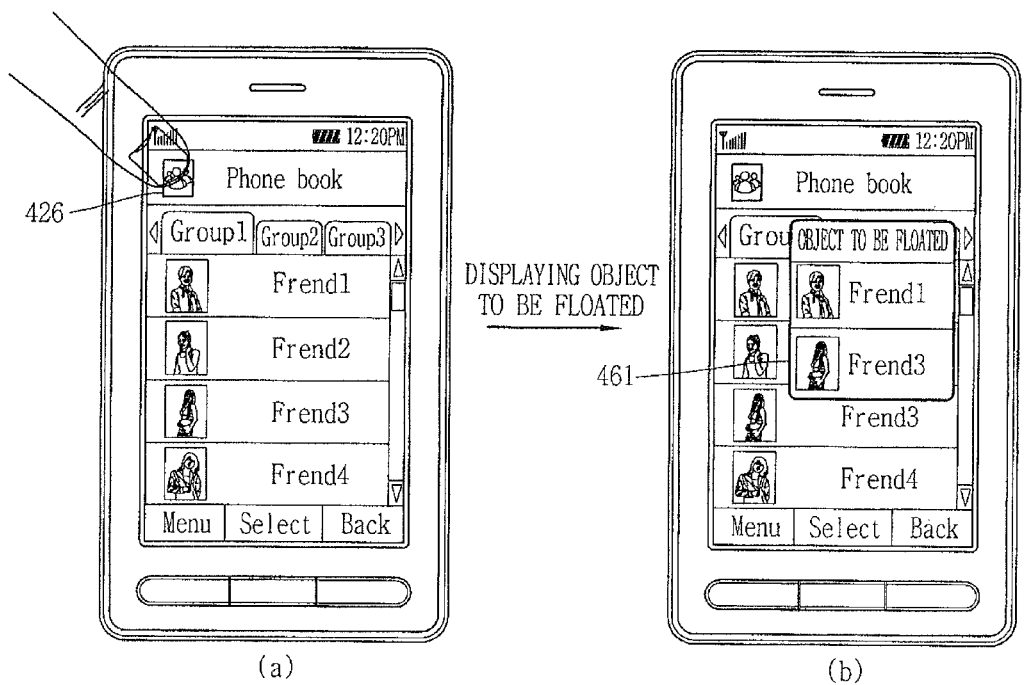
FIG. 8 illustrates a mobile terminal displaying information about a selected object to be floated according to an example embodiment of the present invention.

FIG. 8 illustrates a mobile terminal displaying information of a selected object to be floated according to an example embodiment of the present invention. Other embodiments and configurations may also be within the scope of the present invention.

The floating image may signify that the object to be floated is set, and the controller 180 may display a list of objects that are indicated by the floating image based on an instruction of the user.

For example, if the user touches the floating image 426 for a prescribed amount of time, the controller 180 may display a list 461 of objects corresponding to the displayed floating image. As one example, the list 461 of the objects may be displayed in a pop-up window. The pop-up window may be displayed in an overlaid manner.

The user may select objects within the list 461 in order to edit and/or delete information about the selected object(s).

Figure 9:
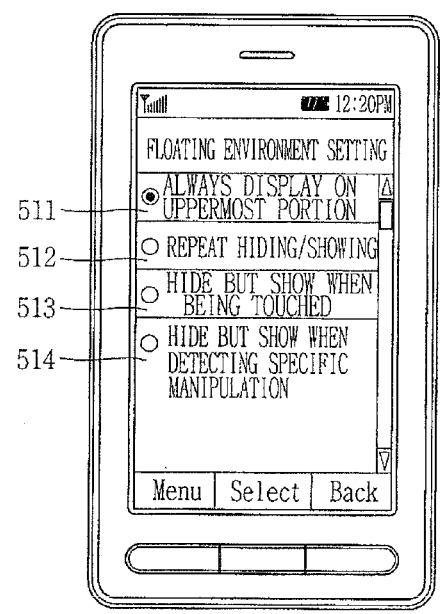
FIG. 9 illustrates a mobile terminal displaying a floating image (or icon) according to an example embodiment of the present invention.

FIG. 9 illustrates a mobile terminal displaying a floating image according to an example embodiment of the present invention. Other embodiments and configurations may also be within the scope of the present invention.

The floating image may signify that the object to be floated is set, whereby information may be directly transferred to the object. The floating image may always be displayed on the display screen even though a certain menu or operation is being executed in the mobile terminal 100.

The mobile terminal 100 may have a relatively small display area, and thereby the display may be controlled according to an operational state. For example, if any transferable information is included in the executed menu, the floating image may be displayed, and if transferable information is not included in the executed menu, the floating image may not be displayed.

The display of the floating image may be controlled by environmental setting options 511, 512, 513, and 514, as shown in FIG. 9.

As shown in FIG. 9, the option 511 relates to always displaying the floating image on an uppermost portion of the display screen. The option 512 relates to repeat hiding and showing the floating image at certain time intervals. The option 513 relates to maintaining a hiding state of the floating image but automatically showing the floating image when a particular area is touched (or proximity touched) or information is selected. The option 514 relates to maintaining a hiding state of the floating image but automatically showing the floating image when a user performs a specific gesture (a hand gesture), a key manipulation and/or flicking. Other options may also be provided.

A position where the floating image is to be displayed may be fixed by default or may be moved to another position by a user's selection.

FIGS. 10A-10D illustrate a mobile terminal showing appending information to be transferred by using a floating image according to an example embodiment the present invention. Other embodiments and configurations may also be within the scope of the present invention.

The information to be transferred may be appended by being selected from an information list. If a menu is being executed or displayed by the mobile terminal, information being played may be appended. The information may be data, such as a multimedia file and/or a text message. The information list may refer to a multimedia file list or to a text message list, for example.

Figure 10A:
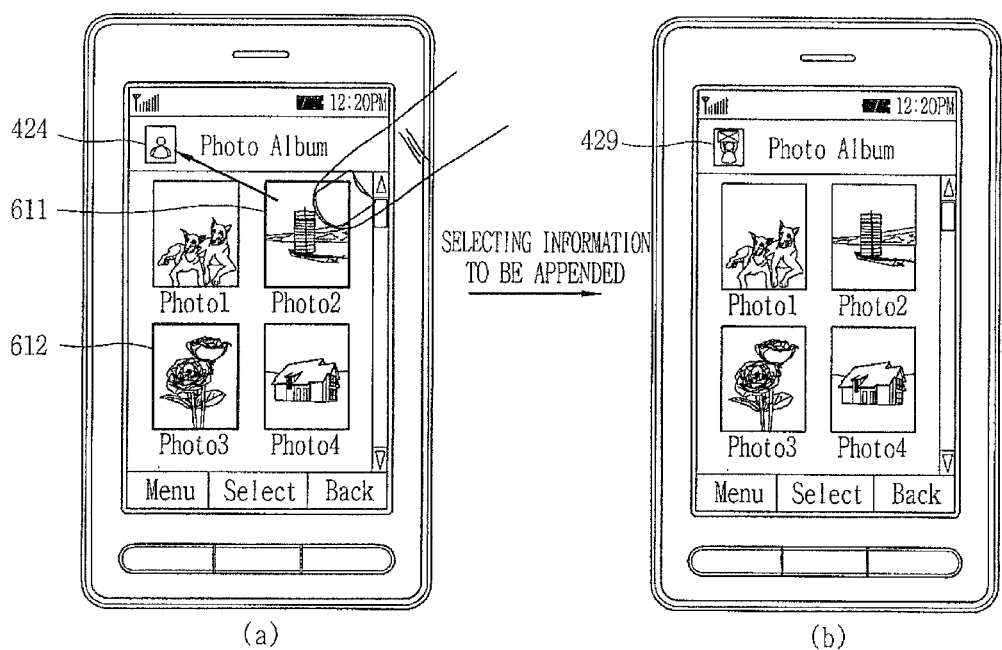
FIGS. 10A-10D illustrates a mobile terminal appending information to be transmitted by using a floating image (or icon) according to an example embodiment of the present invention.

FIG. 10A shows that a photo album menu may be displayed on the display 151. A user may select information 611, 612 (of Photo 2 and Photo 3) to be appended and drag the information 611, 612 to the floating image 424. An image 429 may then be displayed indicating that information has been appended.

Figure 10B:
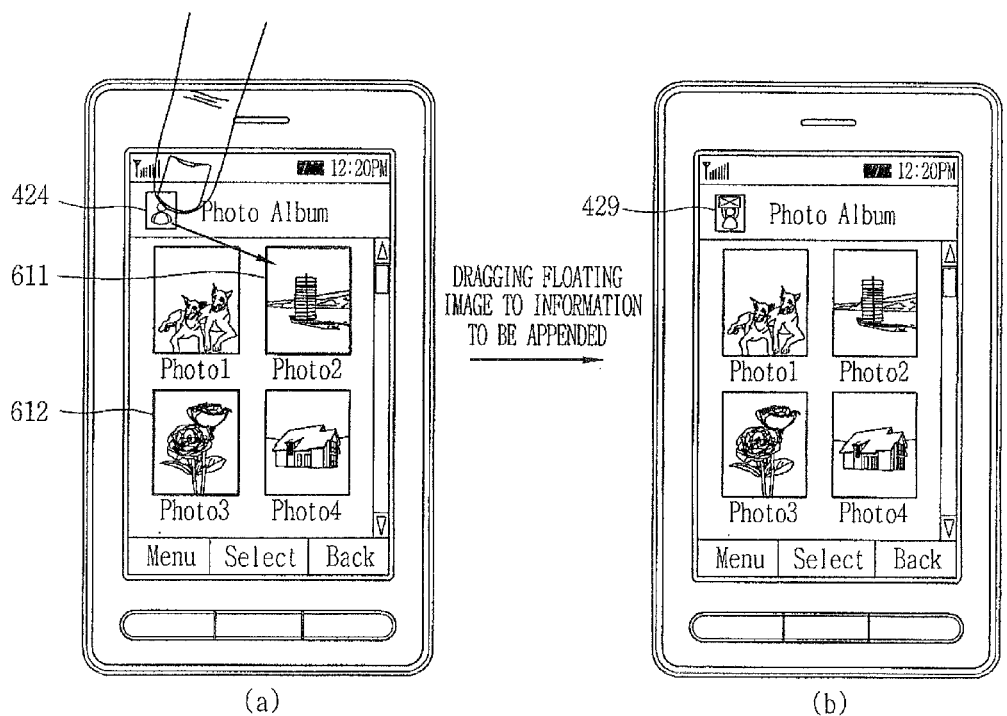

As shown in FIG. 10A, the user may individually select any information (i.e., the information 611, 612) from the information list (i.e., the displayed photo album) or may select information by groups from the information list, and drag or move the information to the floating image 424. Additionally, after information is individually selected or selected by groups from the information list, the user may then drag or move the floating image to any one of the selected information, as shown in FIG. 10B.

Figure 10C:
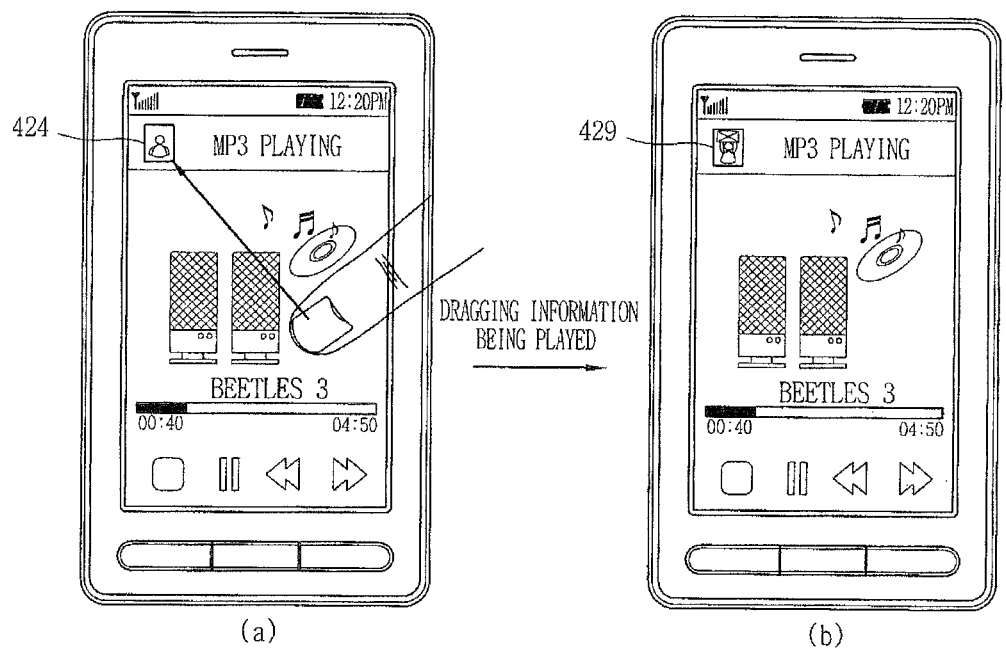

As shown in FIG. 10C, while a menu (e.g., a music reproducing menu) is being executed (or is displayed) by the mobile terminal 100, the user may select a file being played and drag or move a representation of the file onto the floating image 424. An image 429 may then be displayed indicating that information has been appended.

Figure 10D:
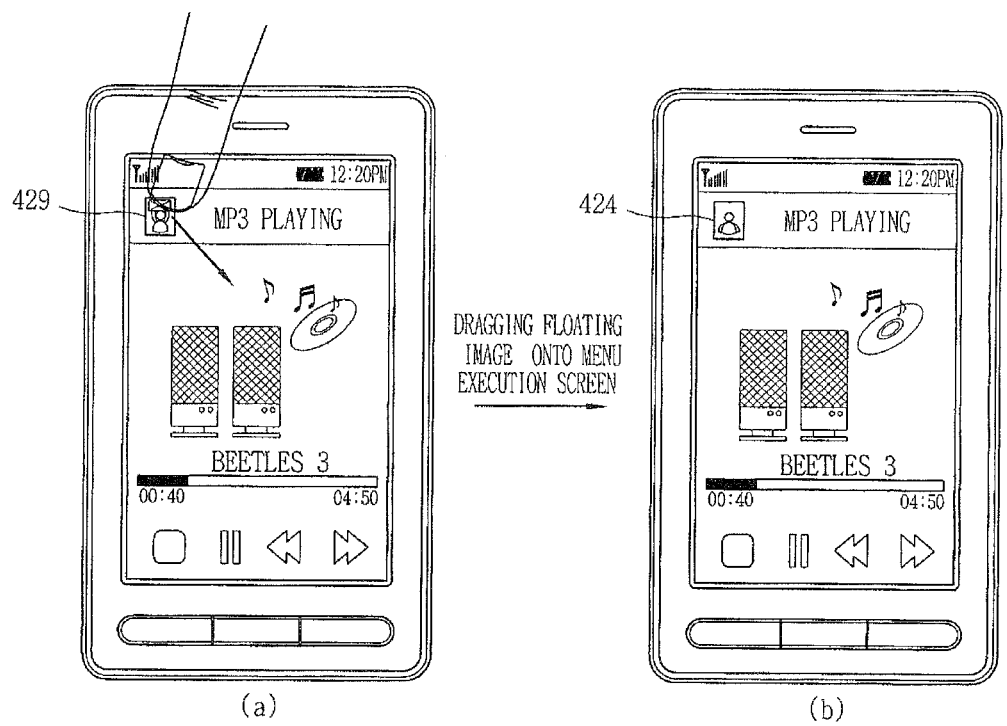

As shown in FIG. 10D, the user may drag or move the floating image to an execution screen where the file may then be played by the mobile terminal 100.

If the displayed information to be transferred is dragged or moved to the floating image or the floating image is dragged or moved to the information to be transferred, the controller 180 may append the information when it is transferred to the entity corresponding to the object. The information may be appended to the floating image.

If the information to be transferred is appended, the controller 180 may change the floating image 424 into a shape (i.e., the image 429) that identifies that information has been appended.

Figure 11:
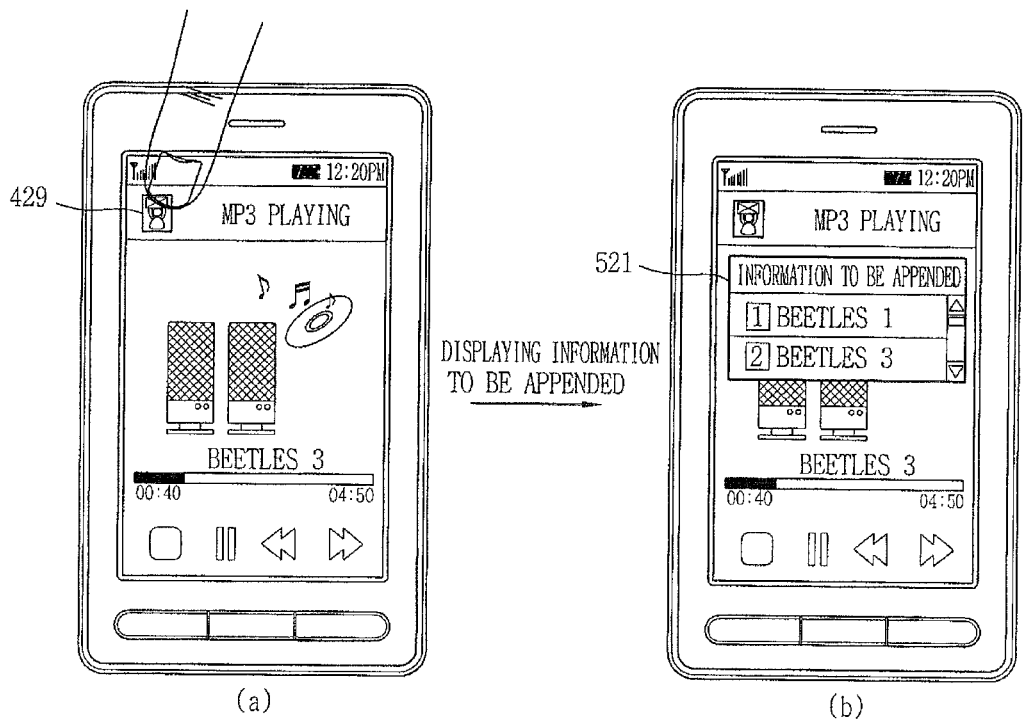
FIG. 11 illustrates a mobile terminal displaying information appended to a floating image (or icon) according to an example embodiment of the present invention.

FIG. 11 illustrates a mobile terminal displaying information appended to the floating image according to an example embodiment of the present invention. Other embodiments and configurations may also be within the scope of the present invention.

The controller 180 may display information appended to the floating image based on an instruction of the user. For example, if the user touches the image 429 for a prescribed amount of time, the controller 180 may display a list 521 of the information appended to the floating image. As one example, the list 521 of the information appended to the floating image may be displayed in a pop-up window. The pop-up window may be displayed in an overlaid manner.

The user may select one from among the list 521 of the information appended to the floating image so as to edit or delete the selected information. For example, if the appended information is a text message, the text message may be edited. Various input methods (e.g., a long-touch, a double-touch, flicking, a long-press, a key manipulation, a menu retrieve and/or the like) may be used for editing or deletion.

The information to be appended may include a multimedia file (e.g., a music file, a picture file, a moving image file), a schedule, a message, an e-mail, phonebook data, an address book, alarm/morning call information, a browser bookmark information, memo information or a widget file.

Figure 12:
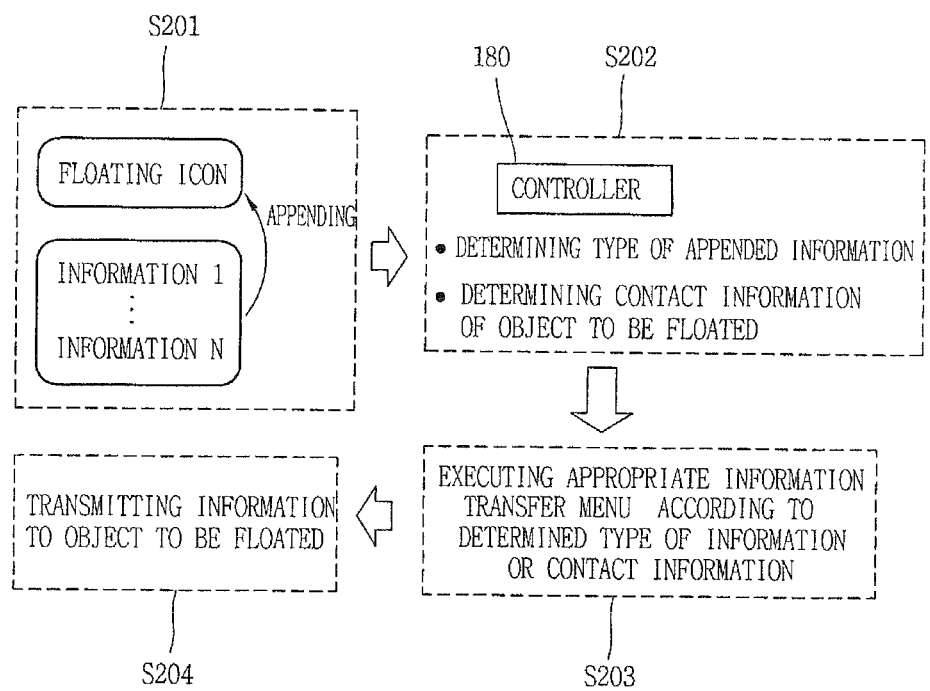
FIG. 12 illustrates a method for transmitting information appended to a floating image (or icon) according to an example embodiment of the present invention.

FIG. 12 is an exemplary view showing transferring information appended to a floating image according to an example embodiment of the present invention. Other embodiments and configurations may also be within the scope of the present invention.

If the information to be transferred to the object to be floated has been appended according to preset environmental setting options, the controller 180 may directly transfer the appended information to an entity corresponding to the object or transfer the appended information by receiving an input of an information transfer command from the user.

The information transfer command may be inputted through one of various methods, such as a voice command, a touch, a dragging of a floating image having the appended information onto a specific display area (e.g., a display area displaying an image associated with the information transfer), a menu selection and/or a key manipulation.

If information to be transferred to the object is appended as shown in element S201, the controller 180 may determine the type of the appended information, as shown in element S202. Based on the determined type of the appended information, the controller 180 may automatically execute an appropriate menu from among information transfer menus, including a short message service (SMS), a multimedia message service (MMS), an e-mail, an instant messenger, etc. that can be executed in the mobile terminal 100, as shown in element S203. The controller 180 may transfer the appended information to the object, as shown in element S204. For example, if the information is a text message having a size less than a certain value, the message may be transferred using a short message service. If the information is a text message having a size greater than a certain value or a specific file is attached to the information, the information may be transferred using a multimedia message service.

The information transfer menu may automatically be selected according to contact information relating to the object. For example, if the contact information is a phone number, either SMS or MMS may automatically be selected. If the contact information is an e-mail, an e-mail transfer menu may automatically be selected. If the contact information is a website (e.g., a bulletin board, a web hard disk or a web storage) address, a file manager menu may automatically be selected. The file manager menu may be a menu for transferring a certain file to a designated internet address.

If the contact information is a device address (e.g., an address of a device for short range communications, such as a BLUETOOTH or an infrared ray), a short range communication scheme appropriate to the information transfer with a corresponding device or Internet (or LAN) communication scheme may be used. If functions (e.g., Internet, short range communications) or menus (e.g., SMS, MMS, E-mail, IM, etc.) that are not provided in the mobile terminal are present, an execution thereof may be restricted, and a message notifying a reason having a difficulty in information transfer may be outputted.

Information may be shared with an object to be floated according to a type of information to be transferred. For example, if preset information, such as schedule information, is to be updated, the updated schedule information may be automatically transferred to an entity corresponding to the object. The information may be applied to the mobile terminal of the object to be floated to which the information has been transferred, thereby sharing the schedule.

Embodiments of the present invention may be implemented in a medium having a program recorded as computer-readable codes. The computer-readable medium may include all types of recording apparatuses each storing data that is readable by a computer system. Examples of such computer-readable media may include ROM, RAM, CD-ROM, magnetic tape, floppy disk, optical data storage element and the like. Such computer-readable medium may be implemented in a type of a carrier wave (e.g., a transmission via an Internet). The computer may include the controller 180 of the mobile terminal 100.

Embodiment of the present invention may provide a method for always displaying an image (or icon) representing a specific object on a display screen and directly transmitting certain information to the specific object by using the image or icon, and a mobile terminal implementing such method.

Embodiments of the present invention may provide a method for always displaying an image (or icon) representing a specific object on a display screen even when a certain menu is being executed, and a mobile terminal implementing such method.

Embodiments of the present invention may provide a method for always displaying an image (or icon) representing a specific object on a display screen, and if any information is dragged onto the image (or icon), to directly transmit such information to the specific object by using an appropriate method for transmitting such information.

A mobile terminal may include a user input unit for receiving a user's selection about at least one object to be floated from a user list, a display module for displaying a floating image (or icon) indicating the selected object to be floated on one side of a display area, and a controller for transmitting certain information to the object to be floated if the certain information is dragged onto the floating image or icon or if the floating image or icon is dragged on the certain information.

A method may include receiving a user's selection about an object to be floated, displaying a floating image (or icon) indicating the selected object on one side of a display area, and if an object is dragged to the floating image (or icon) or if the floating image (or icon) is dragged to the certain object, transmitting information associated with the object to an entity corresponding to the object.

The mobile terminal may always display an image or icon representing a specific counterpart on a display screen even when a menu or operation is being executed.

Embodiments of the present invention may have a convenience of directly transmitting certain information to a specific object by using an image or icon representing the specific object displayed on a display screen.

If information is dragged onto an image or icon representing a specific object displayed on a display screen, the certain information may automatically be transmitted by using an appropriate transfer scheme, depending on a type of the information.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a memory;
    an input unit configured to receive an input for selecting one or more receiving entities, wherein the selecting of the one or more receiving entities is performed by flicking a displayed object in a particular direction, and then displaying the at least one or more graphical images in a specific area of the screen for selection;
    a display unit configured to display a screen of an application being executed in the mobile terminal;
    a wireless communication unit; and
    a controller operatively connected to the memory, the input unit, the display unit and the wireless communication unit, the controller configured to:
        determine whether transferable data is included at displayed on the screen of the application being executed;
        in response to the determination that transferable data is included at displayed on the screen of the application being executed, control the display unit to display, on the screen of the application being executed, one or more graphical images linked to each of the one or more receiving entities for transmitting the transferable data, wherein the displayed graphical images to be at a specific area of the screen, and the displayed graphical images include an icon corresponding to the selected receiving entity or an image corresponding to the selected receiving entity,
        wherein the one or more graphical images for transmitting the transferable data is not displayed on the screen of the application being executed when a result of the determination is that there is no transferable data included at the screen of the application being executed on the screen, and
        in response to the transferable data included at the screen of the application being executed is moved to the displayed at least one of the one or more graphical images or the displayed at least one of the one or more graphical images is moved to the transferable data included at the screen of the application being executed, determining a specific transferring method based on a specific type of the transferable data; and
        transmitting the transferable data, based on the determined specific transferring method, to one or more external terminal corresponding to at least one receiving entity linked to the at least one of the one or more graphical images, wherein the transferring method is one of a Short Message Service (SMS), a Multimedia Message Service (MMS), an email and an instant message.

2. The mobile terminal of claim 1, wherein the one or more graphical images are displayed at the specific area at an uppermost portion of the display unit.

3. The mobile terminal of claim 1, wherein the one or more graphical images are an icon, an avatar, a character or a thumbnail image.

4. The mobile terminal of claim 1, wherein the selecting of the one or more receiving entities is performed through entering of an email address of the receiving entity or a phone number of the receiving entity.

5. The mobile terminal of claim 1, wherein the transferable data includes at least one of a multimedia file, schedule information, a message, an e-mail, a phonebook data, name card information, or a widget file.

6. The mobile terminal of claim 1, wherein the display of the one or more graphical images includes a display of a total number of receiving entities that have been selected.

7. The mobile terminal of claim 1, wherein the input for selecting one or more receiving entities includes at least one input for selecting an entire group of receiving entities.

8. The mobile terminal of claim 7, wherein the at least one input for selecting an entire group of receiving entities includes an input for selecting a displayed group tag and then dragging the group tab to the specific area of the screen.

9. The mobile terminal of claim 1, wherein the controller to receive an input at the specific area of the screen and to subsequently display, on a pop-up window, a list of receiving entities corresponding to the displayed one or more graphical images.

10. The mobile terminal of claim 1, wherein the displayed one or more graphical images indicates that information has been appended.

11. The mobile terminal of claim 1, wherein the controller to change a shape of the one or more graphical images displayed at the specific area when information has been appended.

12. The mobile terminal of claim 1, wherein the controller to receive an input at the displayed one or more graphical images and to subsequently display a list of appended information, and in response to a selection of one of the appended information, the controller to delete or edit the selected one of the appended information.

13. An information transfer method for a mobile terminal, the method comprising:

receiving, via an input unit, an input for selecting a receiving entity, wherein the input for selecting of the one or more receiving entities is performed by flicking a displayed object in a particular direction, and then the at least one or more graphical images are displayed in a specific area of a screen for selection;

displaying, on a display unit, the screen of an application being executed in the mobile terminal, determining whether transferable data is displayed on the screen of the application being executed;

in response to the determination that transferable data is displayed on the screen of the application being executed, controlling the display unit to display, on the screen of the application being executed, one or more graphical images linked to each of the one or more receiving entities for transmitting the transferable data, wherein the displayed graphical images to be at the specific area of the screen, and the displayed graphical images include an icon corresponding to the specific receiving entity or an image corresponding to the specific receiving entity, wherein the one or more graphical images for transmitting the transferable data is not displayed on the screen of the application being executed when a result of the determination is that there is no transferable data displayed on the screen of the application being executed on the screen, in response to the transferable data included at the screen of the application being executed is moved to the displayed at least one of the one or more graphical images, or the displayed at least one of the one or more graphical images is moved to the transferable data included at the screen of the application being executed, determining a specific transferring method based on a specific type of the transferable data; and transmitting the transferable data, based on the determined transferring method, to one or more external terminal corresponding to the at least one receiving entity linked to the at least one of the one or more graphical images, wherein the transferring method is one of a Short Message Service (SMS), a Multimedia Message Service (MMS), an email and an instant message.

14. The information transfer method of claim 13, wherein the one or more graphical images are displayed at the specific area of an uppermost portion of the display unit.

15. The information transfer method of claim 13, wherein the one or more graphical images are an icon, an avatar, a character or a thumbnail image.

16. The information transfer method of claim 13, wherein the selecting of the one or more receiving entities is performed by entering an email address of the receiving entity or a phone number of the receiving entity.

17. The information transfer method of claim 13, wherein the transferable data includes at least one of a multimedia file, schedule information, a message, an e-mail, a phonebook data, name card information, or a widget file.

18. The method of claim 13, wherein displaying of the one or more graphical images includes displaying a total number of receiving entities that have been selected.

19. The method of claim 13, wherein receiving the input for selecting the receiving entity includes receiving at least one input for selecting an entire group of receiving entities.

20. The method of claim 19, wherein receiving the at least one input for selecting an entire group of receiving entities includes receiving an input for selecting a displayed group tag and then dragging the group tab to the specific area of the screen.

21. The method of claim 13, further comprising receiving an input at the specific area of the screen and subsequently displaying, on a pop-up window, a list of receiving entities corresponding to the displayed one or more graphical images.

22. The method of claim 13, wherein the displayed one or more graphical images indicates that information has been appended.

23. The method of claim 13, further comprising changing a shape of the one or more graphical images displayed at the specific area when information has been appended.

24. The method of claim 13, further comprising receiving an input at the displayed one or more graphical images and subsequently displaying a list of appended information, and in response to a selection of one of the appended information, deleting or editing the selected one of the appended information.

* * * * *